G. B. McBEAN.
COUPLING.
APPLICATION FILED JUNE 1, 1909.
941,031.
Patented Nov. 23, 1909.
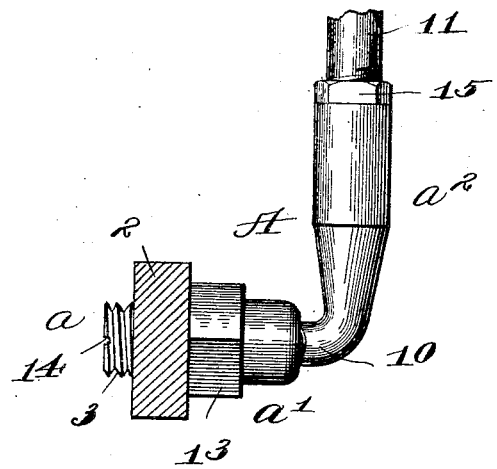
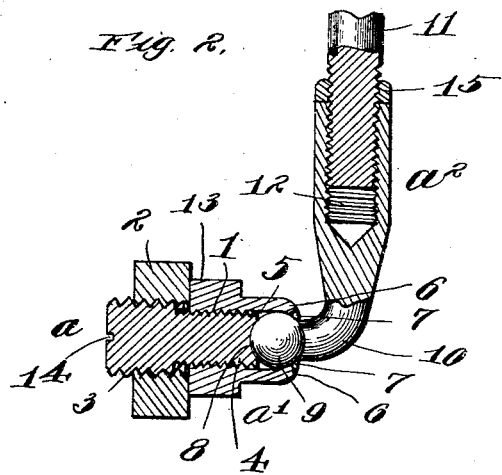
Witnesses:
G. A. Rauberschmidt
K. A. Costello
Inventor,
George B. McBean
By Geo. E. Waldo,
Atty

UNITED STATES PATENT OFFICE.

GEORGE B. McBEAN, OF CHICAGO, ILLINOIS.

COUPLING.

941,031.

Specification of Letters Patent. Patented Nov. 23, 1909.

Application filed June 1, 1909. Serial No. 499,537.

*To all whom it may concern:*

Be it known that I, GEORGE B. MCBEAN, a citizen of the United States, and a resident of Chicago, in the county of Cook and State of Illinois, have invented certain new and useful Improvements in Couplings, of which the following is a specification.

This invention relates to couplings, and relates particularly to couplings comprising articulated members adapted for connection, respectively, to the parts to be coupled.

Specific application of my improved coupling is for connecting the spark and throttle levers of gasolene motors with the parts controlled thereby.

A primary object of the invention is to provide a coupling comprising members articulated by a ball and socket joint, which will be simple, strong and durable and which may be readily applied to the parts designed to be connected thereby.

A further object of the invention is to provide a coupling of this type comprising means for conveniently adjusting the fit of the joint connecting the members of the coupling to prevent lost motion due to wear in said joint or to other cause.

A coupling of my invention comprises the various features, combinations of features and details of construction hereinafter described and claimed.

In the accompanying drawing, in which my invention is fully illustrated—Figure 1 is a side view of a coupling embodying my invention; and Fig. 2 is a longitudinal sectional view thereof.

Referring now to the drawing, A designates, as a whole, a coupling of my invention, comprising members designated, respectively, as a whole, by $a$, $a^1$ and $a^2$.

The member $a$ is screw threaded on its outer surface, one end thereof being adapted for engagement with a correspondingly screw threaded recess 1 in the coupling member $a^1$ and the opposite end thereof being adapted for engagement with a suitable screw threaded hole or opening formed in one of the parts to be connected, as, for example, the throttle lever of a gasolene engine, indicated at 2. In the preferable construction shown, the screw threads at opposite ends of said member $a$ are of different pitch, the relative lengths of said different screw threaded sections being such that, when assembled, the member $a^1$ will bear against the side of the member 2. Preferably, also, said member $a$ comprises sections 3 and 4 of different diameters, the section 3 being adapted for engagement with the hole or opening in the connected member 2 and the section 4 being adapted for engagement with the recess 1 in the member $a^1$, and the pitch of the screw thread on the section 4 being finer than that of the section 3. With this construction it is obvious that the member $a^1$ will form in effect a lock nut, whereby both said members $a$ and $a^1$ may be locked against turning in any desired adjustment.

Formed in the coupling member $a^1$ is a socket 5, the outer side of which is contracted, as shown at 6, and is provided with a hole or opening 7, the inner end of said socket being closed by the outer end of the coupling member $a$. Preferably, also, a recess 8 is formed in the end of the member $a$, which forms, in effect, a complement of the socket 5.

Formed on one end of the coupling member $a^2$ is a ball 9 which, in use, engages the socket 5 in the member $a^1$, the diameter of said coupling member $a^2$ adjacent to said ball 9 being smaller than said ball, as shown at 10, and extending through the hole or opening 7 in the end of the socket 5 in the member $a^2$ and being likewise smaller in diameter than said opening 7. Provision is thus made for limited pivotal movement of the member $a^2$ relatively to the members $a$ and $a^1$.

The member $a^2$ is adapted to be connected to a part, indicated at 11, as the connecting rod or link for connecting the operating lever 2 of the throttle valve of a gasolene motor. As shown, the part 11 is connected to the coupling member $a^2$ by screw threading the end of said member 11 to a correspondingly screw threaded hole or opening 12 formed in the end of said coupling member $a^2$.

In order that the wear on the socket 5 may be sustained mainly by the relatively thick lateral walls thereof, instead of by the outer contracted part 6 thereof, the reduced portion or neck 10 of the member $a^2$ is preferably bent substantially at right angles to the direction of the stress which the part 11 sustains in use.

The parts of my improved coupling may be conveniently assembled for connecting the parts 2 and 11 in the following manner: The ball 9 on the coupling member $a^2$ is first engaged with the socket 5 of the member $a^1$.

The member $a$ is then screwed into the hole or opening in the connected part 2 until the small end 4 thereof projects a desired distance. The member $a^1$ is then screwed onto said section 4 of said member $a$, said member $a$ being adjusted in the hole or opening in the connected part 2 to simultaneously effect engagement of the member $a^1$ with the side of the part 2, and of the recess 8 in the end of the member $a$ with the ball 9 on the end of the member $a^2$ to provide a desirably close fit of said ball in the socket 5. The engagement of the coupling member $a^1$ with the side of the connected part 2, will operate to lock both members $a$ and $a^1$ against rotation, thereby securing the members forming the ball and socket joint in permanent adjustment. In case of wear in said ball and socket joint, this may be conveniently taken up by loosening the member $a^1$, adjusting the member $a$ and again tightening the member $a^1$.

To provide for conveniently turning the member $a^1$, its exterior surface is provided with a hexagonal section 13 adapted for engagement by a wrench. In like manner the end of the member $a$ will be provided for engagement either by a wrench or a screw driver, being, as shown, provided with a slot 14 for engagement by a screw driver. After connecting the coupling to the part 2, the part 11 is screwed into the hole or opening 12 in the end of the coupling member $a^2$, being preferably locked against turning by means of a nut 15 thereon adapted to bear against the end of the member $a^2$. The part 11, the coupling member $a^2$ and the nut 15 form, in effect, a turn-buckle providing convenient means for adjusting the length of the connection between the part 2 and the part connected therewith by the rod 11.

I claim:—

1. A coupling comprising a first member, the outer surface of which is screw threaded and is adapted to engage a correspondingly screw threaded hole or opening in one of the parts designed to be connected by said coupling with the end thereof projecting through the hole or opening in which said first coupling member is secured, a second coupling member provided with a screw threaded hole or opening adapted to engage the projecting end of said first coupling member, a third coupling member adapted for connection to the other part designed to be connected by said coupling, said first and second coupling members being provided with a socket formed partly in said second coupling member and partly in the end of said first coupling member to which said second coupling member is threaded, and a ball on said third coupling member secured in said socket, substantially as described.

2. A coupling comprising a first member, the outer surface of which is screw threaded, said screw threads comprising sections of different pitch, one of said screw threaded sections of said first coupling member being adapted for engagement with a correspondingly screw threaded opening in one of the parts designed to be connected by said coupling with the section thereof having threads of different pitch projecting through the hole or opening in which said first coupling member is secured, a second coupling member provided with a hole or opening adapted for engagement with said projecting end of said first coupling member, a third coupling member adapted for connection to the other part designed to be connected by said coupling, said first and second coupling members being provided with a socket formed partly in said second coupling member and partly in the end of said first coupling member to which said second coupling member is threaded, and a ball on said third coupling member secured in said socket, substantially as described.

3. A coupling comprising a first coupling member comprising sections of different diameters, the outer surfaces of which are screw threaded with threads of different pitch, the larger of said screw threaded sections being adapted for engagement with a correspondingly screw threaded hole in one of the parts designed to be connected by said coupling with the smaller section thereof projecting through the hole in which said larger section thereof is secured, a second coupling member provided with a screw threaded hole adapted for engagement with the smaller screw threaded section of said first coupling member, a third coupling member adapted for connection to the other part designed to be connected by the said coupling, said first and second coupling members being provided with a socket formed partly in said second coupling member and partly in the end of said first coupling member to which said second coupling member is threaded, and a ball on said third coupling member secured in said socket, substantially as described.

4. A coupling comprising a first member, the outer surface of which is screw threaded and is adapted to engage a correspondingly screw threaded hole in one of the parts designed to be connected by said coupling with one end thereof projecting through the hole in which said first coupling member is secured at one side of said connected member and with its opposite end exposed at the opposite side of said connected member, a second coupling member provided with a screw threaded hole or opening adapted to engage the projecting end of said first coupling member, a third coupling member adapted for connection to the other part designed to be connected by said coupling, said first and second coupling members being provided with a socket formed partly in said second coupling member and partly in the end of said first coupling member to which said second coupling member is threaded, and a ball on said third coupling member secured in said socket, substantially as described.

In testimony, that I claim the foregoing as my invention, I affix my signature in presence of two subscribing witnesses this 27th day of May, A. D., 1909.

GEORGE B. McBEAN.

Witnesses:
K. A. COSTELLO,
M. A. REIHAUSPERGER.